United States Patent [19]

Martell

[11] Patent Number: 5,014,445

[45] Date of Patent: May 14, 1991

[54] TRANSMISSION FLUID FILL REGULATOR AND SEAL ASSEMBLY

[75] Inventor: David R. Martell, Manchester, Mich.

[73] Assignee: General Motors Corporation, Detroit, Mich.

[21] Appl. No.: 538,051

[22] Filed: Jun. 13, 1990

[51] Int. Cl.$^5$ .............................................. G01F 23/04
[52] U.S. Cl. ..................................................... 33/731
[58] Field of Search ............... 333/731, 722, 726, 730; 73/290 B

[56] References Cited

U.S. PATENT DOCUMENTS 3,662,470  5/1972  Sasgen ................................. 33/731

FOREIGN PATENT DOCUMENTS 60373  11/1954  France .................................. 33/722

Primary Examiner—Harry N. Haroian
Attorney, Agent, or Firm—Donald F. Scherer

[57] ABSTRACT

A fluid fill regulator and seal assembly (10) for automatic transmissions (11) positionable within a bore (65) provided in the case (12) of a transmission. The assembly comprises a semi-rigid regulator member (20) having a cylindrical body (22) closed at one end (24) and opened at the other end (28); a flexible sealing member (21) formed about the opened end of the regulator member and having an inner contour (54) adapted to receive one end of a transmission fluid filler tube (71); and teeth means (42-45), provided by the regulator means and extending radially from the sealing member to engage the bore in the transmission case and prohibit axial movement of the assembly within the bore. The present invention also provides in combination, a transmission fluid fill regulator and seal assembly (10) with a transmission fluid filler tube (71) and fluid level ullage rod (26). The assembly comprises a semi-rigid regulator member (20) having a cylindrical body (22) closed at one end (24), communicable with the proximal end of the ullage rod; a flexible sealing member (21) formed about the opened end (28) of the regulator member and having an inner contour (54) adapted to receive one end of the fluid filler tube; and teeth means (42-45) provided by the regulator means and extending radially from the sealing member to engage a locating bore in the case of the transmission and prohibit axial movement of the assembly within the bore.

18 Claims, 2 Drawing Sheets

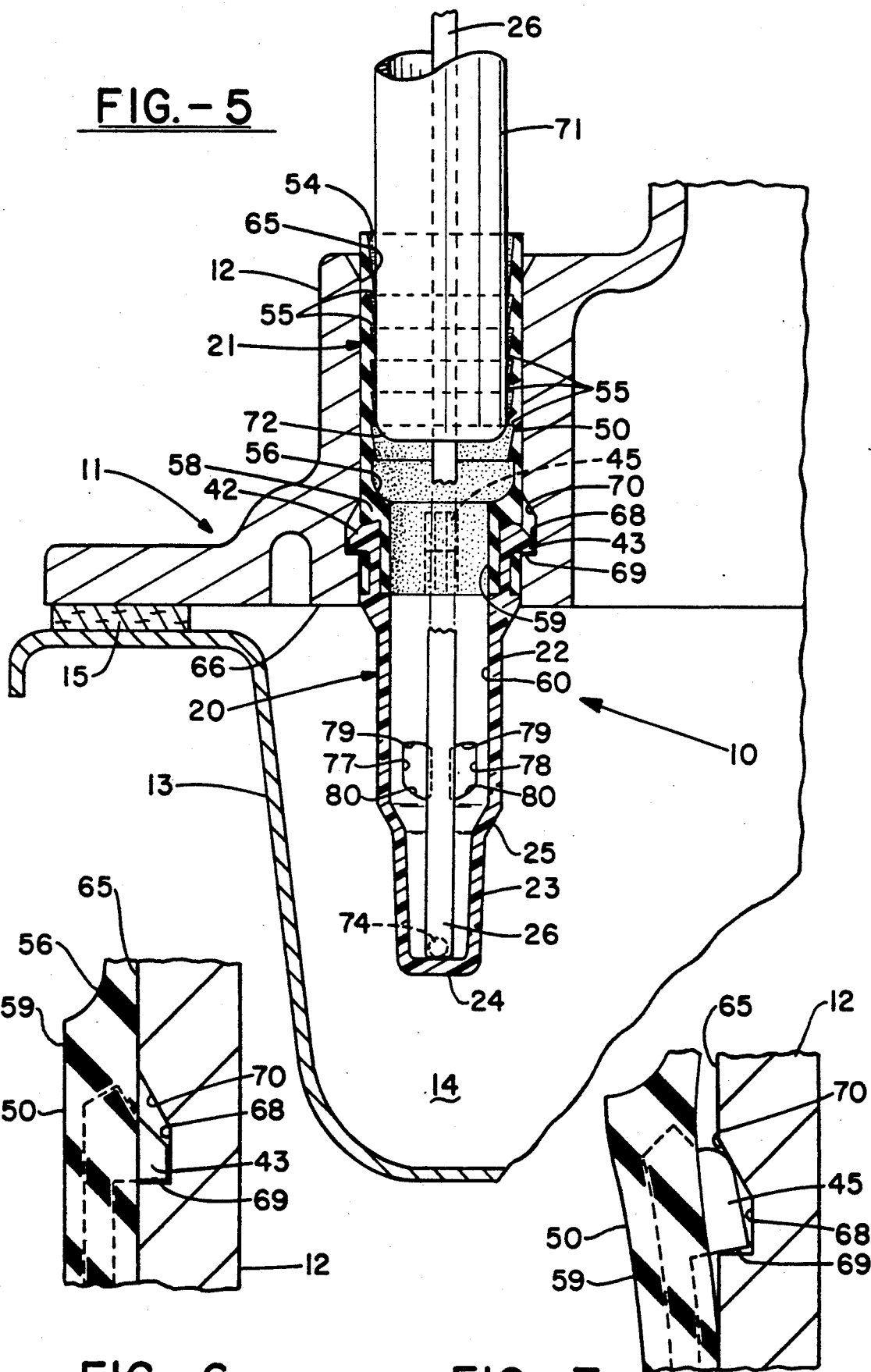

TRANSMISSION FLUID FILL REGULATOR AND SEAL ASSEMBLY

TECHNICAL FIELD

The present invention relates generally to a filler tube and dipstick stop regulator for a fluid sump such as those found in automatic transmissions. More particularly, the present invention provides a means for properly filling automatic transmissions of automobiles during vehicle assembly, and for subsequently allowing the vehicle owner and/or service attendant to check the fluid level of the transmission. Specifically, the present invention comprises a two component structure for the transmission casing which provides fluid fill regulation, dipstick stop functions and, a filler tube seal.

BACKGROUND OF THE INVENTION

Currently, the automatic transmission is filled during vehicle assembly by use of automatic equipment. A specific volume of fluid, which is intended to overfill the transmission, is introduced through the filler tube. The transmission is then cycled to ensure all passages are filled. Fluid is subsequently withdrawn through the filler tube until the fluid level drops lower than the tube end, exposing it to air, thus causing a pressure change which is detected by the processing equipment. This signals an end to the fluid withdrawal portion of the fill cycle, setting the fluid level within the transmission.

As shipped from the assembly plant, the transmission fluid level can and does vary due to many identified sources. The location of the filler tube end relative to the machined features of the transmission case is a major contributor, being affected by filler tube length, tube mounting location, and casting variances as well as case machining tolerances. Furthermore, the sensitivity of shut-off for the filling equipment, coupled with the orientation and configuration of the tube end, add more variance to the fluid level. Lastly, the differences in volumes of internal components between individual transmissions add another significant fluid level variance particularly because the transmission is filled when relatively cold, but its operational fluid level limits are defined as being in a "hot" condition and the fluid expands around these internal components when heated. This last variance, however, is not addressed by the present invention.

Presently, the fluid level indicating hardware consists of a ullage rod or dipstick which is snaked through the filler tube and protrudes into the transmission bottom pan where the rod tip is expected to be immersed in the transmission fluid. In order to provide a frame of reference, this rod is stopped, or grounded, in one of two places. One is at the remote end of the filler tube, where the location and length variances of the filler tube and the like, add to the variances of the dipstick length and markings, to total the errors of fluid level indication. To eliminate some of these variances, another method attaches a stop for the rod tip to components located on the transmission underside. This latter method has reduced the indicating errors, providing the dipstick does indeed, make contact with the stop. Packaging constraints have prevented addition of a dipstick-guided feature. This lack of a guiding feature often eliminates the reduction of indicating error provided by the stop, because the dipstick tip may not hit or stay on the stop. In order to provide an improved product and customer satisfaction, it is desired that these cumulative variances and errors, as a whole, be reduced.

The existing state of the art suggests that improved indicating hardware can provide more consistent filling of automatic transmissions with fluid, initially during automobile assembly, and subsequently, whenever the transmission is serviced or checked.

SUMMARY OF THE INVENTION

It is therefore an object of the present invention to provide a fluid fill regulator and seal assembly for automatic transmissions that will facilitate the ready and accurate filling of the transmission during the time of vehicle assembly.

It is another object of the present invention to provide a fluid fill regulator and seal assembly, as above, that will ensure that the fluid level shown on the indicating hardware is accurate.

It is yet another object of the present invention to provide a fluid fill regulator and seal assembly, as above, that will ensure that any fluid level displayed within the limits shown on the indicating hardware is within the transmission's operational range.

These and other objects of the invention, as well as the advantages thereof over existing and prior art forms, which will be apparent in view of the following detailed specification, are accomplished by means hereinafter described and claimed.

In general, the present invention is directed to a fluid fill regulator and seal assembly for automatic transmissions positionable within a bore provided in the case of a transmission, comprising a semi-rigid regulator member having a cylindrical body closed at one end and opened at the other end; a flexible sealing member formed about the opened end of the regulator member and having an inner contour adapted to receive one end of a transmission fluid filler tube; and teeth means, provided by the regulator means and extending radially from the sealing member to engage the bore in the transmission case and prohibit axial movement of the assembly within the bore.

The present invention also provides a fluid fill regulator and seal assembly, for automatic transmissions positionable within a bore provided in the case of a transmission, comprising a semi-rigid regulator member having a cylindrical body closed at one end and opened at the other end, first and second pairs of opposed fingers projecting from the open end and a radially extending tooth carried by each of the fingers; and a flexible sealing member formed about the first and second pairs of opposed fingers and having a cylindrical outer contour through which the teeth protrude radially and an inner contour adapted to receive one end of a transmission fluid filler tube; whereby the sealing member communicates substantially with the bore of the transmission case and the teeth are engageable therewith to prohibit axial movement of the assembly within the bore.

Finally, the present invention provides in combination, a transmission fluid fill regulator and seal assembly with a transmission fluid filler tube and fluid level ullage rod, the assembly comprising a semi-rigid regulator member having a cylindrical body closed at one end, communicable with the proximal end of the ullage rod; a flexible sealing member formed about the opened end of the regulator member and having an inner contour adapted to receive one end of the fluid filler tube; teeth means, provided by the regulator member and extending radially from the sealing member to engage a locating bore in the case of the transmission and prohibit axial movement of the assembly within the bore.

BRIEF DESCRIPTION OF THE DRAWINGS

FIG. 5 is an elevational view, in cross section, showing the regulator component and its elastomeric seal as these may be mounted to a transmission casing;

FIG. 6 is an enlarged elevational view, in cross section, of a short finger tooth illustrating its engagement within an annular groove in a bore within the transmission casing; and FIG. 7 is an enlarged elevational view, in cross section, of a tall finger tooth illustrating its engagement within the annular groove.

DESCRIPTION OF AN EXEMPLARY EMBODIMENT

Figure 2:
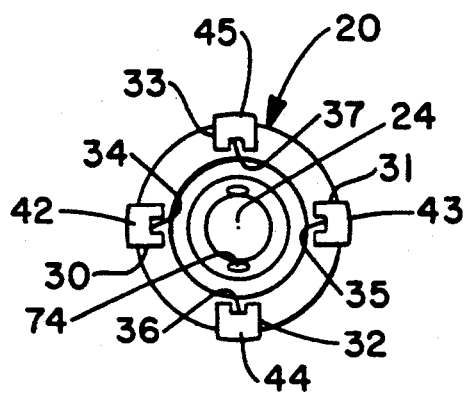
FIG. 2 is a top view of the component depicted in FIG. 1.

One representative form of the transmission fluid fill regulator and seal assembly which accomplishes the objects of the present invention is designated generally by the numeral 10 on the accompanying drawings. With particular reference to FIG. 5, the representative assembly 10 is depicted in conjunction with a vehicular transmission, a portion of which is designated generally be the numeral 11. As depicted, the transmission 11 includes a case 12 and a pan 13 which may be bolted, or otherwise secured to the case 12 to form an enclosure 14 which contains the transmission fluid. As is known, a gasket 15 is positioned between the case and pan to prevent leakage of the fluid. While the complete transmission 11 contains other components, for the sake of simplicity, only a portion of the case 12 and pan 13 have been depicted as are necessary to provide an environment and understanding of the assembly 10.

Figure 1:
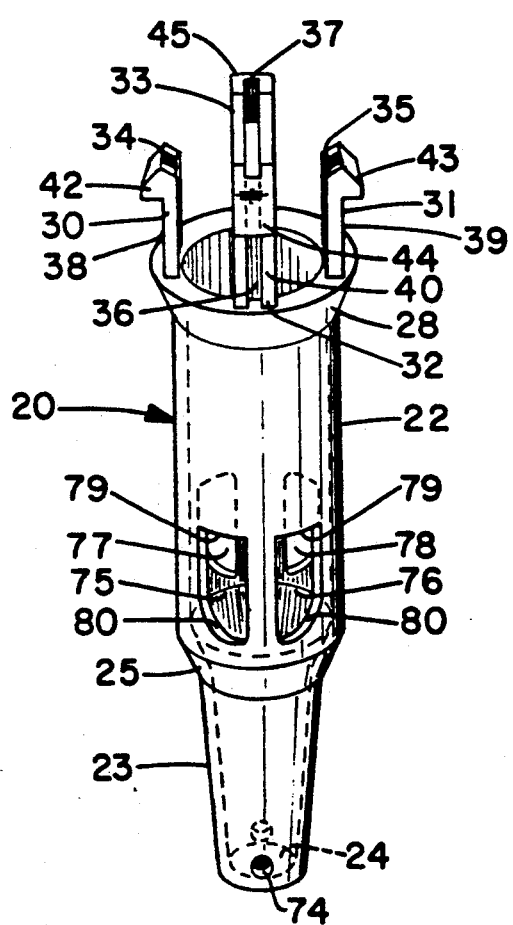
FIG. 1 is an isometric view of a transmission fluid fill regulator and dipstick stop which comprises one component of the instant invention.
Figure 3:
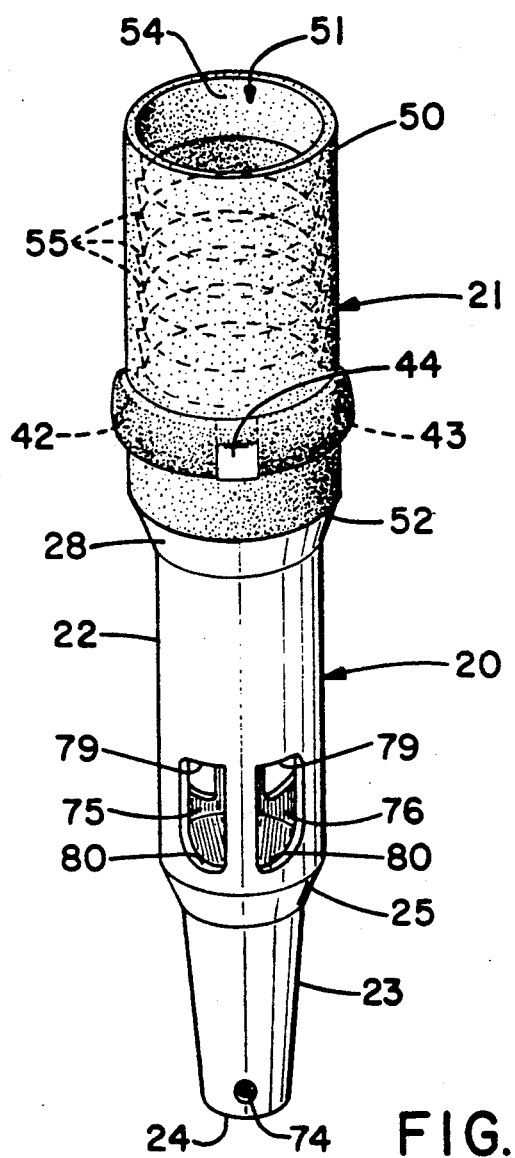
FIG. 3 is an isometric view illustrating the component of FIG. 1 as it may be combined with a molded-on elastomeric component forming a filler tube seal.

With reference now to FIGS. 1 and 3, the assembly 10 comprises a regulator member, generally 20 and a flexible sealing member, generally 21. The regulator member 20 is a semi-rigid structure, preferably manufactured from a plastic that is not sensitive to transmission fluid or the operating temperatures of the transmission. It performs two functions: one being a fluid fill regulator; and the other being a dipstick stop.

The regulator member 20 provides a generally cylindrical body 22 having stepped diameters. Thus, the body 22 extends to form a narrow conically-shaped end 23, closed at 24, which is joined to the body by a tapered wall 25. The length of the body 22 and end 23 is dimensioned to project a specific distance into the enclosure 14, thereby providing a bottom or stop for the ullage rod, or dipstick 26.

At the opposite, upper end of body 22, a flared or beveled mouth 28 is provided which is open. First and second pairs of opposed fingers 30, 31 and 32, 33 extend axially away from the mouth 28. The fingers each have an inner axial channel, 34, 35, 36 37, respectively, abutting transverse outer grooves 38, 39, 40, 41, respectively, and outer, radially extending teeth 42, 43, 44, 45, respectively, which shall be discussed hereinbelow.

The flexible sealing member 21 is preferably a moldable elastomer that is resistant to heat and transmission fluid. According to the preferred embodiment, the sealing member 21 is molded about regulator member 20, which can be accomplished by insert molding. It comprises a cylindrical body 50, having a mouth 51, and at the opposite end, an open base 52, that communicates with the beveled mouth 28 of regulator member 20. The body 50 encompasses the first and second pairs of fingers 30, 31, 32, 33 and only the teeth 42, 43, 44, 45 are exposed around the outer surface 53.

Figure 4:
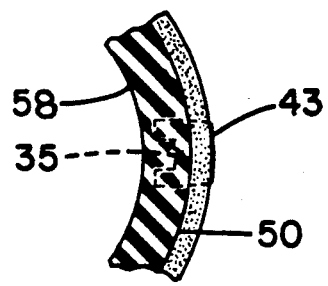
FIG. 4 is an enlarged cross-sectional view through the elastomeric seal component in the area of a finger tooth which forms an integral part of the regulator component depicted in FIG. 1.

The inner surface of sealing member 21 provides first, a tapered wall 54; a plurality of circumferential ridges 55; a curved shoulder 56 and a short neck 58 having an inner surface 59 which is coaxial with the inner wall 60 of regulator body member 22. As is depicted in FIG. 4, the neck 58, of sealing member 21, encompasses the axial channel 35 and transverse outer grooves 39 of finger 31; thus providing a mechanical interlock between the two members. In similar fashion, the other channels and transverse outer grooves of fingers 30, 32 and 33 are also embedded within the sealing member neck 58.

The installation of assembly 10 in the case of a transmission shall be described with reference to FIGS. 5-7. As in customary, a bore 65 is provided in transmission case 12 for the receipt of a conventional fluid filler tube through which fluid can be added, as well as withdrawn at the time of installation and original filling. The bore 65 passes through the case 12 and opens into the enclosure 14 at the case inner surface 66. Near the inner surface 66, an inner circumferential groove 68 is provided which has a square face 69 and sloped face 70.

The assembly 10 is located within the bore 65 by positioning the regulator member 20 therein and then urging it into the enclosure 14. Because the fingers 30-33 are semi-rigid and the seal member 21 is flexible, the latter readily tolerate the distortion that occurs during insertion as the teeth 42-45 move along the bore 65. When the assembly 10 is properly located within the bore 65 the finger teeth are seated within the circumferential groove 68. More particularly, the first pair of finger teeth 42, 43 seat directly against the square face 69, as is depicted in FIG. 6 for the tooth 43. This seating prevents further movement of the assembly into the transmission. Similarly, the second pair of finger teeth 44, 45 press radially against the sloped face 70 of groove 68, as is depicted in FIG. 7 for the tooth 45. These fingers maintain the assembly 10 axially in position and inhibit withdrawal from the transmission.

At this stage, the filler tube 71 is urged into the flexible member 21. The ridges 55 are in sealing contact with the tube 71 to prevent fluid leakage to atmosphere. The shoulder 56 will limit the extent to which the tube 71 can be inserted in the member 21. As a general rule, the position of the tube is determined by a bracket, not shown, which is mounted on the transmission case 12. The filler tube serves as the port into the transmission for fluid and also receives the proximal end of the transmission fluid dipstick 26. Once the dipstick end is inserted into the filler tube 71, it is guided smoothly along neck inner surface 59, the inner wall 60 of regulator element 22, the tapered wall 25 and the end 23 until it comes to rest against the bottom 24. Inasmuch as the position and length of assembly 10 is fixed, a very accurate reading of the transmission fluid level is always possible, unlike the existing art in which the filler tube length and position, and the dipstick stop affixed to the remote end of the dipstick, are utilized to measure the fluid level. Any of these variables can and do affect the oil level read on the dipstick.

Insertion of the filler tube 71 compresses the ridges 55 and, in turn, the seal member 21 within the case bore 65. In this manner, the case is sealed to prevent the loss of fluid as well as the ingress of contaminants, such as water, dirt and the like.

At the bottom of the conically shaped end 23 is provided a small transverse hole 74 to allow the fluid level within the regulator member 20 to equalize with the surrounding fluid and prevent erroneous readings of the dipstick when the fluid levels are very low within enclosure 14. Four larger ports 75, 76, 77, 78 are provided in the lower area of the regulator body 22 for the addition and extraction of fluid at plant assembly, as well as the subsequent addition of fluid by the owner and/or service personnel. The ports 75-78 are dimensioned so that their upper edges 79 regulate the fluid level attained during the production fill process and the lower edges 80 are angled to prevent the dipstick from being trapped or stuck prior to reaching the bottom 24.

In conclusion, while certain specific details of a particular embodiment have been shown for the purpose of illustrating the invention, it should be apparent to those skilled in the art that various changes and modifications may be made therein without departing from the spirit or scope of the invention. For instance, it will recognized by those knowledgeable in this art that assembly 10 may be made from various plastic and elastomeric materials which are compatible with the selected lubricating fluid and the particular environment involved. Therefore, the invention is not limited by the type of material used for the assembly 10.

As such, the present invention not only teaches an assembly to facilitate the ready and accurate filling of an automatic transmission at the time of plant assembly, but also that the other objects of the invention can likewise be accomplished. It is, therefore, to be understood that any evident variations fall within the scope of the claimed invention and thus, the selection of specific component elements can be determined without departing from the spirit of the invention herein disclosed and described. Moreover, the scope of the invention shall include all modifications and variations that may fall within the scope of the attached claims.

The embodiments of the invention in which an exclusive property or privilege is claimed are defined as follows:

1. A fluid fill regulator and seal assembly, positionable within a bore provided in a case comprising: a semi-rigid regulator member having a cylindrical body closed at one end and opened at the other end; a flexible sealing member formed about said opened end of said regulator member and having an inner contour adapted to receive one end of a fluid filler tube; and teeth means, provided by said regulator member and extending radially from said sealing member to engage the bore in the case and prohibit axial movement of said assembly within said bore.

2. A fluid fill regulator and seal assembly, as set forth in claim 1, wherein said regulator member further includes first and second pairs of opposed fingers projecting from said opened end and, said teeth means are carried by said fingers.

3. A fluid fill regulator and seal assembly, as set forth in claim 2, wherein said first pair of opposed fingers are shorter than said second pair of opposed fingers.

4. A fluid fill regulator and seal assembly, as set forth in claim 3, wherein said first and second pairs of opposed fingers provide an axial channel intersecting transverse grooves formed adjacent said teeth means.

5. A fluid fill regulator and seal assembly, as set forth in claim 1, wherein said inner contour of said flexible sealing member carries a plurality of circumferential ridges.

6. A fluid fill regulator and seal assembly, as set forth in claim 1, said regulator member providing a transverse hole near said closed end and a plurality of ports within said cylindrical body which allow fluid to pass in and out of said assembly.

7. A transmission fluid fill regulator and seal assembly, positionable within a bore provided in the case of a transmission and having a ullage rod comprising: a semi-rigid regulator member having a cylindrical body closed at one end and opened at the other end; first and second pairs of opposed fingers projecting from said open end; and a radially extending tooth carried by each of said fingers; and a flexible sealing member formed about said first and second pairs of opposed fingers having a cylindrical outer contour through which said teeth protrude radially and an inner contour adapted to receive one end of a transmission fluid filler tube; whereby said sealing member communicates substantially with the bore of the transmission case and said teeth are engageable therewith to prohibit axial movement of said assembly within the bore.

8. A transmission fluid fill regulator and seal assembly, as set forth in claim 7, wherein said first pair of opposed fingers are shorter than said second pair of opposed fingers.

9. A transmission fluid fill regulator and seal assembly, as set forth in claim 8, wherein said first and second pairs of opposed fingers provide an axial channel and intersecting transverse grooves formed on the outer surface of said cylindrical body.

10. A transmission fluid fill regulator and seal assembly, as set forth in claim 9, wherein said inner contour of said flexible sealing member carries a plurality of circumferential ridges.

11. A transmission fluid fill regulator and seal assembly, as set forth in claim 7, said regulator member providing a transverse hole near said closed end and a plurality of ports within said cylindrical body which allow fluid to pass in and out of said assembly.

12. A transmission fluid fill regulator and seal assembly, as set forth in claim 7, wherein said inner contour of said flexible sealing member carries a plurality of circumferential ridges for sealing with said filler tube and said cylindrical body has an inner contour having a shape for guiding the ullage rod toward said closed end.

13. In combination, a transmission fluid fill regulator and seal assembly with a transmission fluid filler tube and fluid level ullage rod, said assembly comprising: a semi-rigid regulator member having a cylindrical body closed at one end, communicable with the proximal end of said ullage rod; a flexible sealing member formed about an opened end of said regulator member and having an inner contour adapted to receive one end of said fluid filler tube; and teeth means, provided by said regulator member and extending radially from said sealing member to engage a locating bore in the case of said transmission and prohibit axial movement of said assembly within the bore.

14. The combination, as set forth in claim 13, wherein said cylindrical body is opened at one end and said regulator member further includes first and second pairs of opposed fingers projecting from said opened end and, said teeth means are carried by said fingers.

15. The combination, as set forth in claim 14, wherein said first pair of opposed fingers are shorter than said second pair of opposed fingers.

16. The combination, as set forth in claim 15, wherein said first and second pairs of opposed fingers provide an axial channel and intersecting transverse grooves on their outer surface.

17. The combination, as set forth in claim 13, wherein said inner contour of said flexible sealing member carries a plurality of circumferential ridges engageable with an end of said fluid filler tube.

18. The combination, as set forth in claim 13, said regulator member providing a transverse hole near said closed end and a plurality of ports within said cylindrical body which allow fluid to pass in and out of said assembly.

* * * * *